United States Patent [19]
Barile et al.

[11] Patent Number: 5,407,270
[45] Date of Patent: Apr. 18, 1995

[54] STIRRING PITCHER

[76] Inventors: Miriam Barile; Dante Barile, both of 9500 Gouin Blvd., Pierrefonds, Quebec, Canada, H8Y 1T7

[21] Appl. No.: 112,076

[22] Filed: Aug. 26, 1993

Related U.S. Application Data

[63] Continuation-in-part of Ser. No. 852,560, Mar. 17, 1992, abandoned.

[51] Int. Cl.$^6$ ............................................. B01F 7/20
[52] U.S. Cl. .................................... 366/247; 366/325
[58] Field of Search ............... 366/242, 244, 245, 247, 366/248, 249, 250, 251, 252, 279, 64, 65, 325

[56] References Cited

U.S. PATENT DOCUMENTS

| | | | |
|---|---|---|---|
| 1,002,931 | 9/1911 | Reaume | 366/245 |
| 4,010,934 | 3/1977 | McCord | 366/247 |
| 4,893,940 | 1/1990 | Waisberg | 366/247 |
| 4,946,286 | 8/1990 | Purkapile | 366/247 |

Primary Examiner—Robert W. Jenkins

[57] ABSTRACT

A pitcher with a stirring device including a lid which is firmly fitted in the top end of the pitcher. The lid includes a rotatable disc sitting in a recess in the lid and rotated by an eccentric knob. A stirring device including a stem is fitted centrally through an opening in the lid to the disc such that on rotating the knob, the disc and the stem rotate relative to the pitcher. The stem is provided with four equi-angularly disposed wings which stir the liquid.

7 Claims, 2 Drawing Sheets

STIRRING PITCHER

CROSS-REFERENCE TO RELATED APPLICATION

This application is a continuation-in-part application from application Ser. No. 07/852,560, filed Mar. 17, 1992.

BACKGROUND OF THE INVENTION

1. Field of the Invention

The present invention relates to containers, and more particularly, to a pitcher for storing and mixing liquids in which solids are suspended, such as fruit or vegetable juices.

2. Description of the Prior Art

It is well known to store vegetable or fruit juices in an upstanding plastic pitcher having a lid and a pour spout. Such liquids, however, must be stirred before they are consumed since the solids, such as fibers and other solids, gravitate towards the bottom of the container when the container is immobile for a period of time. Thus, it is necessary to remove the lid and stir the liquid before it is poured.

Attempts have been made to provide integrated stirring devices, and one such example can be seen from U.S. Pat. No. 4,893,940, Waisberg, issued Jan. 16, 1990. The Waisberg patent includes an upstanding pitcher with a lid insertable within the pitcher and a rotatable plate on the top of the lid. Depressions are provided in the plate which are eccentric from the axis from the stirring stem to rotate the stirring stem within the container.

SUMMARY OF THE INVENTION

It is an aim of the present invention to provide an improved container with an integrated stirring mechanism.

A construction in accordance with the present invention is a stirring pitcher comprising a pitcher body having a base, an upstanding cylindrical wall with a peripheral rim, a lid detachably connected to the rim of the wall, the lid having a recess on the upper surface thereof, the recess being defined by a circular ridge forming part of the lid, a circular disc rotatably mounted in the recess, the lid including a central opening concentric with the recess, the disc including a coupling projection extending centrally of the disc and through the opening in the lid, a rod within the pitcher detachably connected to the coupling projection on the lid, the rod including a free end bearing in a socket formed on the base, a plurality of planar wings mounted to the rod in an equi-angular arrangement, and a knob provided on the disc spaced radially from the central projection for rotating the disc and the rod.

The provision of a disc seated in the lid with the top surface of the disc flush with the lid provides for a convenient rotating wheel for rotating the stirrer, and a knob is eccentrically mounted on the disc for rotating the disc. This rotating device is more easily manipulated by the end user, particularly persons with arthritis or other debilitating handicaps. The wings or paddles mounted on the stem are sufficient to stir the liquid and move the fibers which have settled towards the bottom of the liquid.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
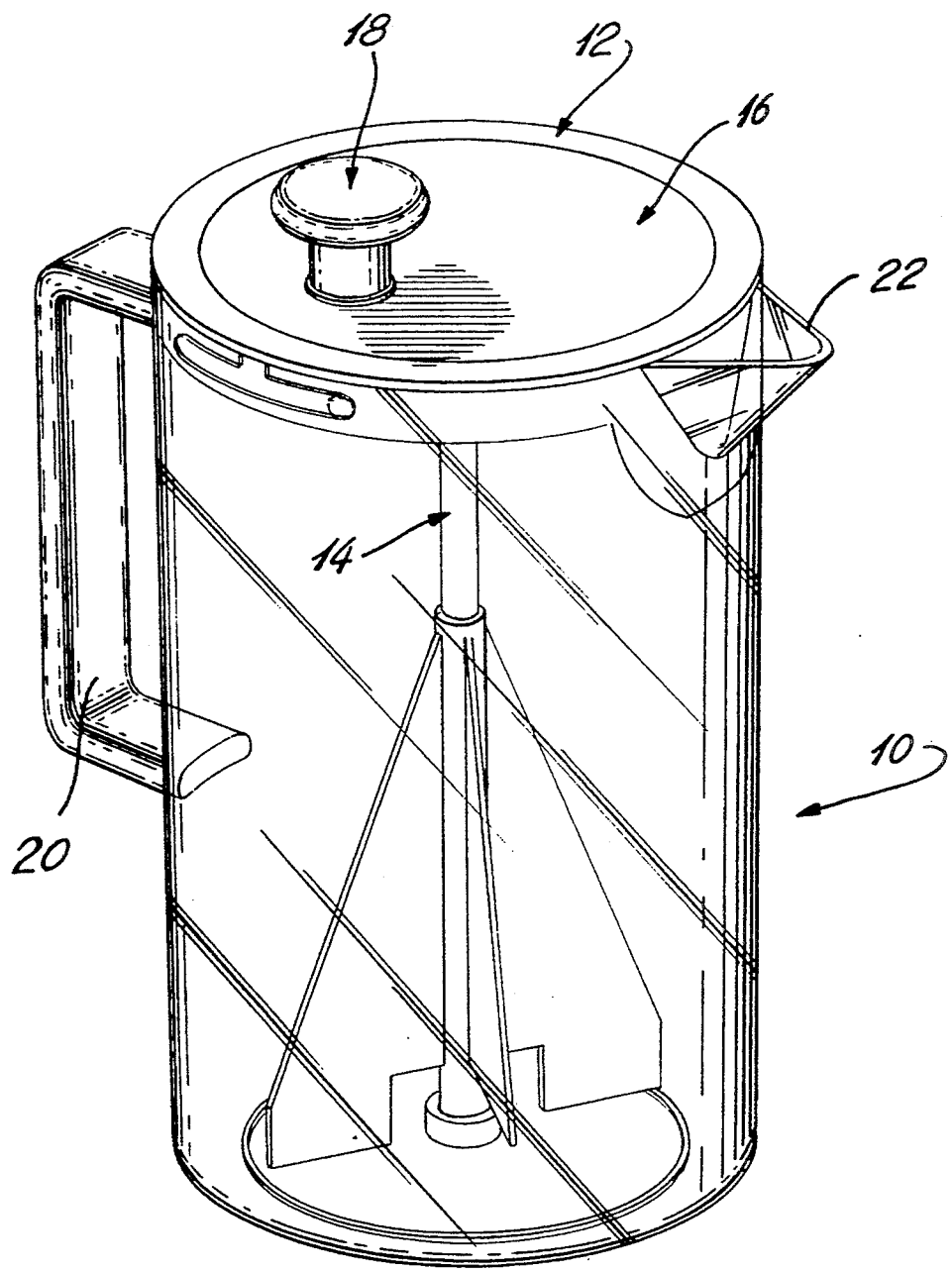
FIG. 1 is a perspective view of a pitcher having an integrated stirring device in accordance with the present invention.
Figure 2:
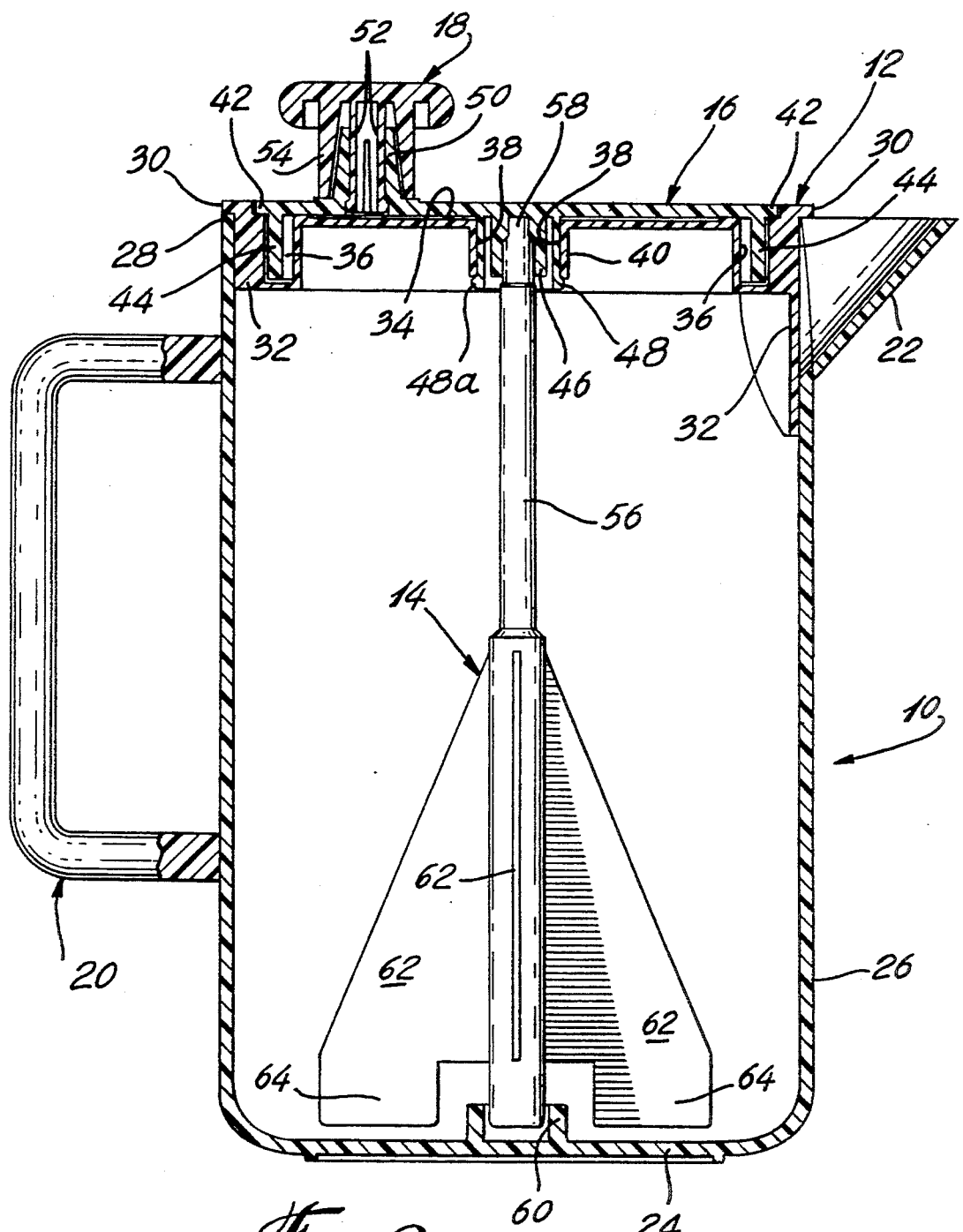
FIG. 2 is a vertical cross-section, taken through the pitcher shown in FIG. 1.

Referring now to the drawings, there is shown a pitcher 10 having a lid 12 with a stirring device 14 extending into the pitcher. The stirring device is connected to a disc 16 rotatable on the lid 12 by means of a knob 18. The pitcher includes a handle 20 and pour spout 22.

The pitcher 10 includes a base 24 with an upstanding cylindrical wall 26 which may be transparent and which has a rim 28 at the top of the wall 26 defining the top opening of the pitcher 10. The lid 12 includes a circular periphery 30 with a downwardly extending flange 32 adapted to be seated on the rim 28 of the wall 26. The lid 12 includes a recess 34 with a deeper groove 36. The recess is circular, and the groove is a continuous cylindrical groove. The lid 12 is also provided with a central opening 38 and a downwardly extending cylindrical projection 40.

The disc 16 is seated in the recess 34 and is adapted to rotate therein concentric with the center of the lid which coincides with the center of the opening 38. The disc 16 has a downwardly extending cylindrical ridge 44 which slides in the cylindrical groove 36. As can be seen, the top planar surface of the disc 16 is flush with the top surface of the lid 12.

The disc 16 includes a cylindrical socket 46 which extends downwardly from the center thereof within the opening 38 and is concentric with the cylindrical projection 40. A cylindrical segmented bearing wall 48 also extends downwardly from the disc 16 and is engaged for circular movement with the cylindrical projection 40 of the lid 12. A bead 48a is provided at the bottom edge of the bearing wall 48 to snap fit into the cylindrical projection 40.

The disc 16 is also provided with an upstanding socket 50 to receive a cylindrical bearing wall 52 of the knob 18. The bearing wall 52 engages the socket 50 for rotating movement therein and includes a bead at the bottom edge thereof to snap fit within the socket 50. The cylindrical bearing wall 52 may be split in order to allow easy detachment of the knob 18 from the disc 16 for purposes of cleaning. The knob 18 is also provided with a cylindrical skirt 54 which bears on the top surface of the disc 16.

The stirring device 14 includes a stem 56 having a top flattened end portion 58 adapted to be engaged within the socket 46 of the disc 16. The stem 56 is thus in the axis of rotation of the disc 16. A socket 60 is provided on the base 24 and is adapted to receive the free end of the stem 56 to allow for stable rotation of the otherwise cantilevered stem 56.

Four stirring panels or wings 62 extend radially from the stem 56. The wings 62 are planar and are equi-angularly disposed about the stem 56. There may be two or more wings 62, and they are preferably triangularly shaped, as shown in the drawings. At least two of the wings 62 would have extensions 64 which pass close to the base 24 to stir up the solids, such as fibers, which might have settled to the bottom of the pitcher.

In operation, the liquid is poured into the pitcher 10 when the lid 12 is removed. The lid 12 is easily disassembled for cleaning purposes by removing the stem 56 from the socket 46, the knob 18 from the socket 50, and the disc 16 from the lid 12. These parts can be reassembled by snap fitting them one into the other as described.

Once the pitcher is full of liquid, the lid 12, including the stem 56 attached to the disc 16 and the knob 18 attached to the socket 50, is then placed on the top of the pitcher and firmly fitted therein by the engagement of the flange 32 and the periphery 30 with the rim 28 of the wall 26. When it is required to pour the liquid, such as fruit juice, the spout guard, which is an extension of flange 32, is moved from its alignment with the spout 22 by rotating the lid 12. Knob 18 is then engaged, and the disc 16 is rotated thereby rotating the stem 56 and thus the wings 62 to stir the liquid.

We claim:

1. A stirring pitcher comprising a pitcher body having a base, an upstanding cylindrical wall with a peripheral rim, a lid detachably connected to the rim of the wall, the lid having a recess on the upper surface thereof, the recess being defined by a circular ridge forming part of the lid, a circular disc rotatably mounted in said recess, the lid including a central opening concentric with the recess, the disc including a coupling projection extending centrally of the disc and through the opening in the lid, a rod within the pitcher detachably connected to the coupling projection on the lid, the rod including a free end bearing in a socket formed on the base, a plurality of planar wings mounted to the rod in an equi-angular arrangement, and a knob provided on the disc spaced radially from the central projection for rotating the disc and the rod.

2. A stirring pitcher as defined in claim 1, wherein the lid is attached to the peripheral rim of the wall by means of a bayonet connection.

3. A stirring pitcher as defined in claim 1, wherein there are four wings mounted to the rod.

4. A stirring pitcher as defined in claim 3, wherein at least two of the wings extend a short distance from the base within the pitcher whereby solids in the liquid to be stirred are stirred up from a position close to the base by means of the said two wings.

5. A stirring pitcher as defined in claim 1, wherein the knob on the disc is a mushroom-shaped knob.

6. A stirring pitcher as defined in claim 1, wherein the knob is detachably connected to a shaft extending upwardly from the disc and rotates about the axis of the shaft.

7. A stirring pitcher as defined in claim 1, wherein each of the wings includes an edge sloping downwardly at 45° from the rod from a position midway of the rod and terminating close to the bottom of the rod.

* * * * *